United States Patent
Mistry

(10) Patent No.: US 10,839,064 B2
(45) Date of Patent: Nov. 17, 2020

(54) SECURELY ENTERING CREDENTIALS VIA HEAD-MOUNTED DISPLAY DEVICE

(71) Applicant: Citrix Systems, Inc., Fort Lauderdale, FL (US)

(72) Inventor: Shaunak Mistry, Scotts Valley, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 155 days.

(21) Appl. No.: 15/627,958

(22) Filed: Jun. 20, 2017

(65) Prior Publication Data
US 2018/0365405 A1 Dec. 20, 2018

(51) Int. Cl.
| | |
|---|---|
| *G06F 21/36* | (2013.01) |
| *G06F 3/01* | (2006.01) |
| *G06F 3/023* | (2006.01) |
| *G06F 3/0484* | (2013.01) |

(52) U.S. Cl.
CPC .............. *G06F 21/36* (2013.01); *G06F 3/012* (2013.01); *G06F 3/013* (2013.01); *G06F 3/017* (2013.01); *G06F 3/0236* (2013.01); *G06F 3/04842* (2013.01)

(58) Field of Classification Search
CPC ........... G06F 21/36; G06F 3/012; G06F 3/013
See application file for complete search history.

(56) References Cited

U.S. PATENT DOCUMENTS

| | | | | |
|---|---|---|---|---|
| 6,396,497 B1* | 5/2002 | Reichlen | ............... | G06F 3/011 |
| | | | | 345/427 |
| 10,540,492 B1* | 1/2020 | Norris, III | ............... | G06F 21/36 |
| 2013/0167225 A1* | 6/2013 | Sanft | ....................... | G06F 21/36 |
| | | | | 726/19 |
| 2015/0278492 A1* | 10/2015 | Tungare | ................. | G06F 21/31 |
| | | | | 726/19 |

(Continued)

OTHER PUBLICATIONS

"Oculus;" Accessed May 15, 2017; https://www.oculus.com/.

(Continued)

*Primary Examiner* — Noura Zoubair
(74) *Attorney, Agent, or Firm* — Banner & Witcoff, Ltd.

(57) ABSTRACT

Methods and systems for securely entering credentials via a head-mounted display device are described herein. A display of a head-mounted device may display, in a first arrangement, a plurality of graphical user interface (GUI) elements. Each of the plurality of GUI elements may indicate a different character of a plurality of characters. The head-mounted device may receive a first user selection of a GUI element from the plurality of GUI elements displayed in the first arrangement. The method may comprise storing the first user selection of the GUI element. After receiving the first user selection of the GUI element, the plurality of GUI elements may be displayed on the display of the head-mounted device and in a second arrangement different from the first arrangement. The head-mounted device may receive a second user selection of a GUI element from the plurality of GUI elements displayed in the second arrangement. The (Continued)

method may comprise determining, based at least in part on the first user selection and the second user selection, whether to grant the user access to a resource.

21 Claims, 13 Drawing Sheets

(56) References Cited

U.S. PATENT DOCUMENTS

2017/0318019 A1\* 11/2017 Gordon .............. G06K 9/00617
2017/0346817 A1\* 11/2017 Gordon .............. G02B 27/0172

OTHER PUBLICATIONS

Lang, Ben; Oculus Rift Manufacturing Overview Reveals 200+ Custom Parts, IPD Adjustment Mechanism; Sep. 25, 2015; Accessed May 15, 2017; http://www.roadtovr.com/oculus-rift-manufacturing-overview-reveals-200-custom-parts-ipd-adjustment-mechanism.
Inertial Measurement Unit from Wikipedia; Accessed May 15, 2017; https://en.wikipedia.org/Inerital_measurement_unit.
Head-Mounted Display from Wikipedia; Accessed May 12, 2017; https://en.wikipedia.org/wiki/Head-mounted_display.
Hands-On Samsung's C-Lab Project: Monitorless; Accessed May 12, 2017; https://www.sammobile.com/2017/03/03/hands-on-samsungs-c-lab-project-monitorless/.
Google Cardboard—Google VR; Accessed Apr. 28, 2017; https://vr.google.com/cardboard/.
Hardesty, Larry; "Eye-Tracking System Uses Ordinary Cellphone Camera;" MIT News Office; Jun. 15, 2016; http://news.mit.edu/2016/eye-tracking-system-uses-ordinary-cellphone-camera-0616.
Daydream; Accessed Apr. 28, 2017; https://vr.google.com/daydream/.

\* cited by examiner

SECURELY ENTERING CREDENTIALS VIA HEAD-MOUNTED DISPLAY DEVICE

FIELD

Aspects described herein generally relate to computer networking and data security. More specifically, aspects described herein relate to securely providing credentials, such as via a head-mounted display device.

BACKGROUND

Credentials, such as passwords and personal identification numbers (PINs), are commonly used to unlock devices or access local or network resources. But conventional password and password-like authentication mechanisms may be vulnerable to brute force attacks or shoulder surfing, and some users are moving away from conventional passwords. Biometric authentication, such as fingerprint authentication, facial recognition, and voice authentication, have been introduced to address the problems with conventional password entry mechanisms. However, biometric authentication typically only provides a few variations (e.g., 10 variations for fingerprint authentication) and can be spoofed or otherwise compromised. For example, a fingerprint may be lifted, facial recognition may be spoofed using a photograph, and voice authentication may be tricked using an audio recording.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards systems, apparatuses, computer-readable media, memory, and methods for displaying, on a display of a head-mounted device and in a first arrangement, a plurality of graphical user interface (GUI) elements. Each of the plurality of GUI elements may indicate a different character of a plurality of characters. The head-mounted device may receive a first user selection of a GUI element from the plurality of GUI elements displayed in the first arrangement. The method may comprise storing the first user selection of the GUI element. After receiving the first user selection of the GUI element, the plurality of GUI elements may be displayed on the display of the head-mounted device and in a second arrangement different from the first arrangement. The head-mounted device may receive a second user selection of a GUI element from the plurality of GUI elements displayed in the second arrangement. The method may comprise determining, based at least in part on the first user selection and the second user selection, whether to grant the user access to a resource.

In some aspects, the first user selection may be based on a first actuation of a physical button associated with the head-mounted device. The second user selection may be based on a second actuation of the physical button associated with the head-mounted device. Additionally or alternatively, the first user selection may be based on a first eye blink captured by a camera associated with the head-mounted device. The second user selection may be based on a second eye blink captured by the camera associated with the head-mounted device. Additionally or alternatively, the first user selection may be based on a first head movement measured by one or more sensors associated with the head-mounted device. The second user selection may be based on a second head movement measured by the one or more sensors associated with the head-mounted device.

In some aspects, the method may comprise displaying, on the display of the head-mounted device, a second plurality of GUI elements. Each of the second plurality of GUI elements may indicate a different color of a plurality of colors. The head-mounted device may receive a third user selection of a GUI element from the second plurality of GUI elements. In some aspects, determining whether to grant the user access to the resource may be based at least in part on the first user selection, the second user selection, and the third user selection.

In some aspects, the head-mounted device may comprise a virtual reality headset having the display or an augmented reality headset having the display. The resource may comprise, for example, an enterprise resource. Additionally or alternatively, the resource may comprise an application running on the head-mounted device. Additionally or alternatively, the resource may comprise a device wirelessly connected to the head-mounted device.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards methods and systems for displaying, on a display of a head-mounted device and in a first arrangement, a plurality of graphical user interface (GUI) elements. Each of the plurality of GUI elements may indicate a different character of a plurality of characters. The head-mounted device may receive a first user selection of a GUI element from the plurality of GUI elements displayed in the first arrangement. The method may comprise storing the first user selection of the GUI element. After receiving the first user selection of the GUI element, the plurality of GUI elements may be displayed on the display of the head-mounted device and in a second arrangement different from the first arrangement. The head-mounted device may receive a second user selection of a GUI element from the plurality of GUI elements displayed in the second arrangement. The method may comprise determining, based at least in part on the first user selection and the second user selection, whether to grant the user access to a resource.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
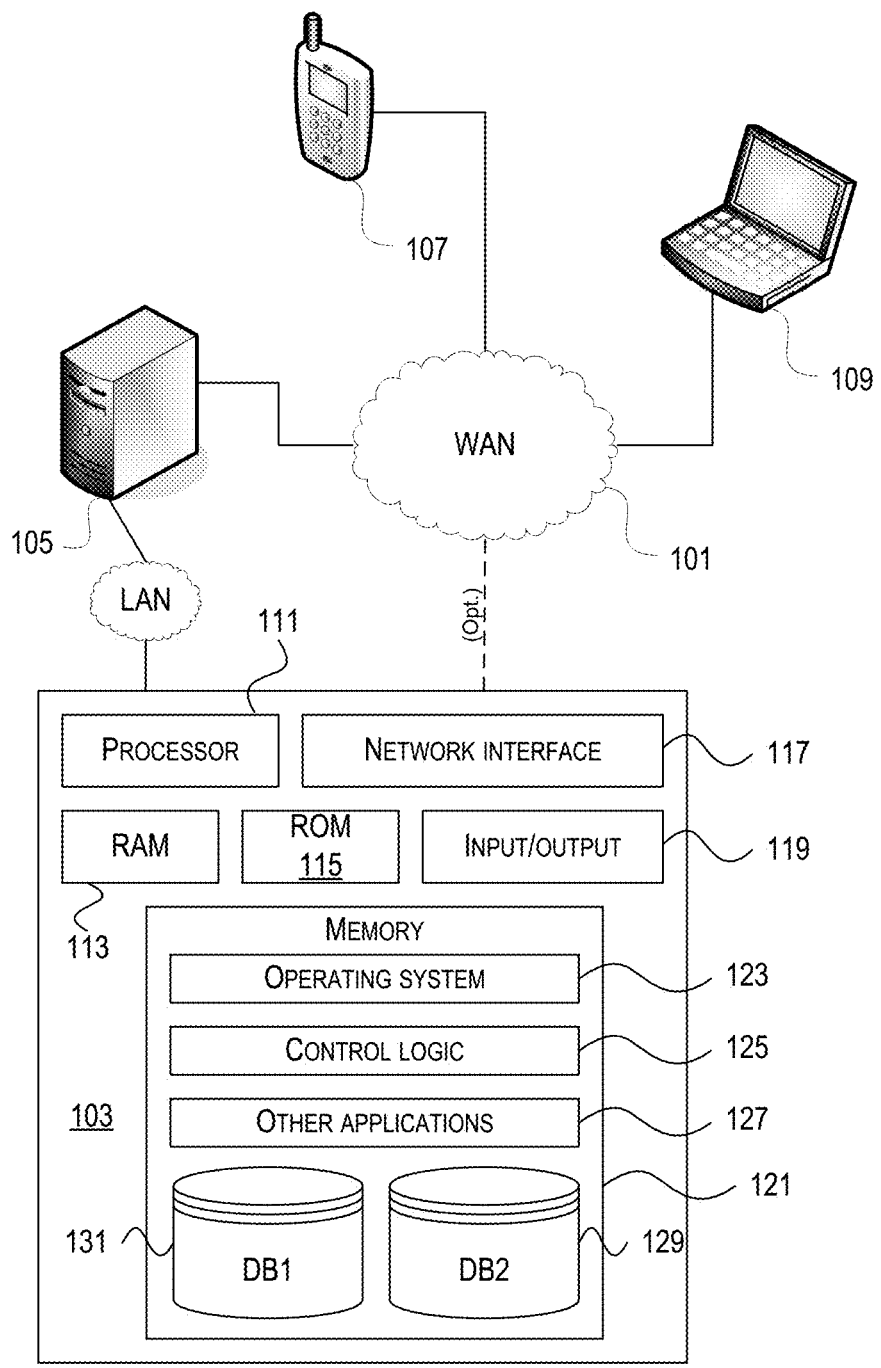
FIG. 1 depicts an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, LANs, metropolitan area networks (MAN) wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include random access memory (RAM) 113, read only memory (ROM) 115, network interface 117, input/ output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
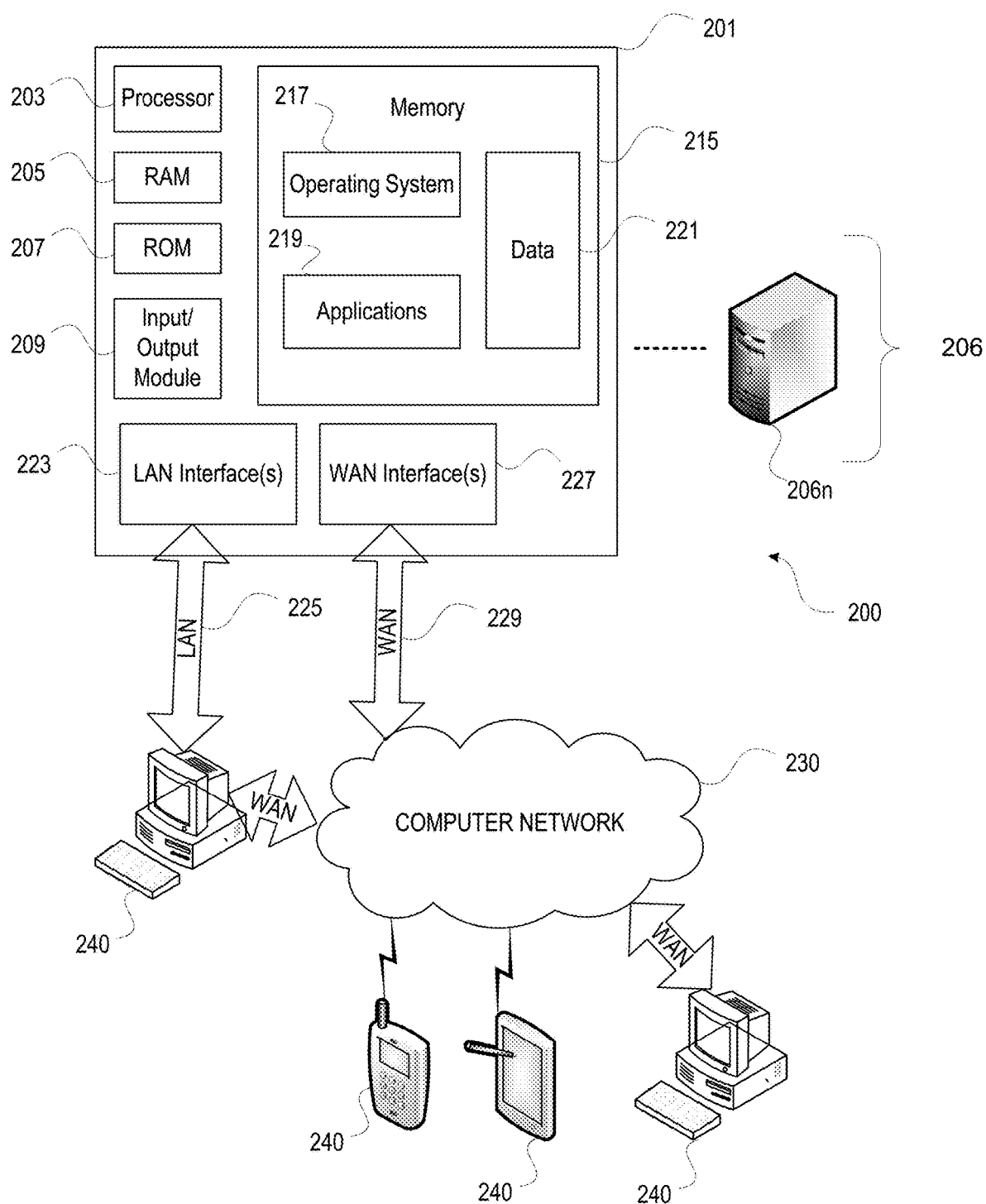
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including RAM 205, ROM 207, I/O module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 106a that receives requests from a client machine 240, forwards the request to a second server 106b, and responds to the request generated by the client machine 240 with a response from the second server 106b. First server 106a may acquire an enumeration of applications available to the client machine 240 and well as address information associated with an application server 206 hosting an application identified within the enumeration of applications. First server 106a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Figure 3:
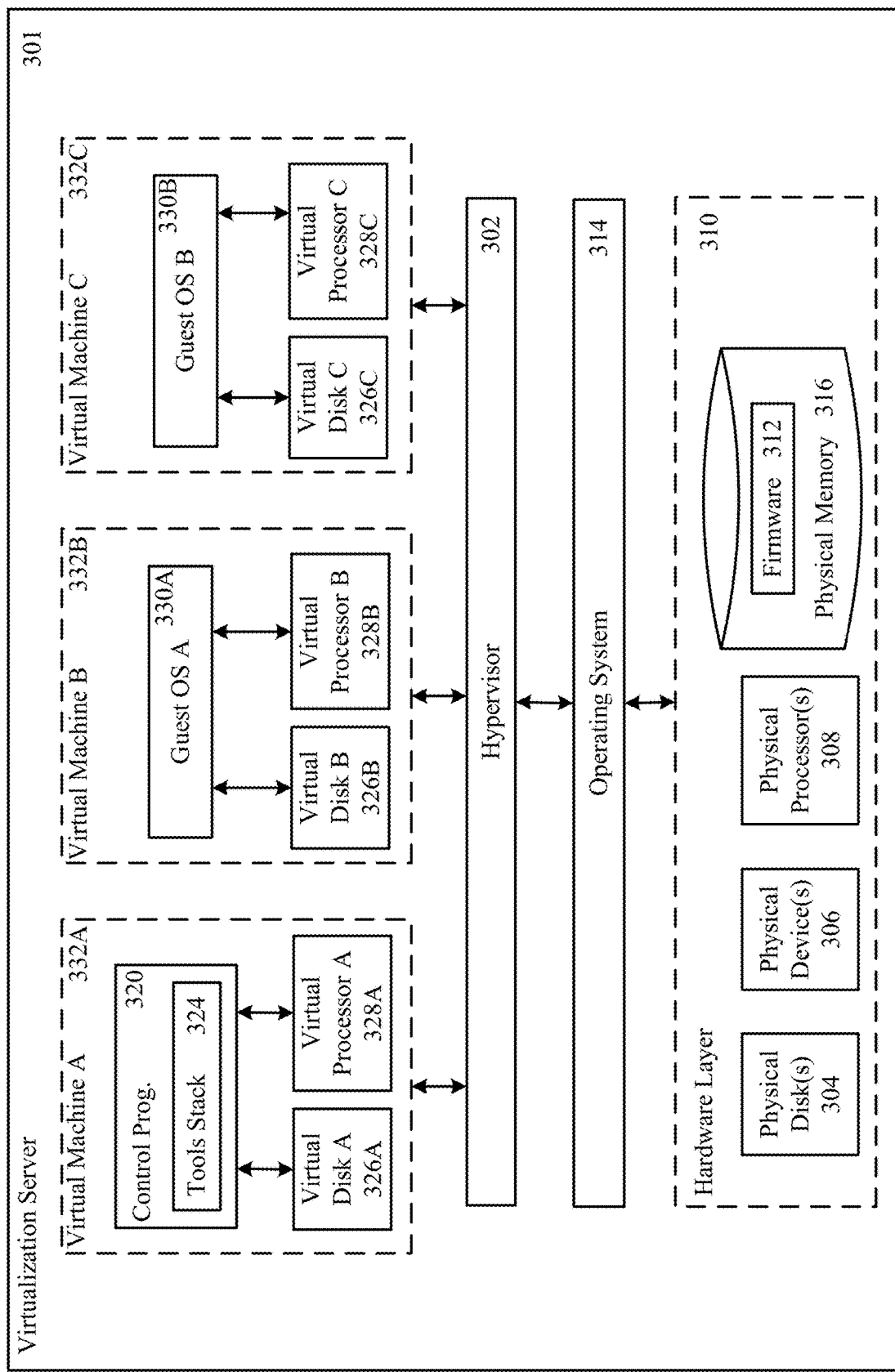
FIG. 3 depicts an illustrative virtualized (hypervisor) system architecture that may be used in accordance with one or more illustrative aspects described herein.

With further reference to FIG. 3, a computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308 and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more memory 216. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor that executes within an operating system 314 executing on the virtualization server 301. Virtual machines then execute at a level above the hypervisor. In some embodiments, the Type 2 hypervisor executes within the context of a user's operating system such that the Type 2 hypervisor interacts with the user's operating system. In other embodiments, one or more virtualization servers 201 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316 and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 controls processor scheduling and memory partitioning for a virtual machine 332 executing on virtualization server 301. Hypervisor 302 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, virtualization server 301 executes a hypervisor 302 that creates a virtual machine platform on which guest operating systems may execute. In these embodiments, the virtualization server 301 may be referred to as a host server. An example of such a virtualization server is the XEN SERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may executes a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, provides each virtual machine 332 with a unique virtual view of the physical hardware, memory, processor and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
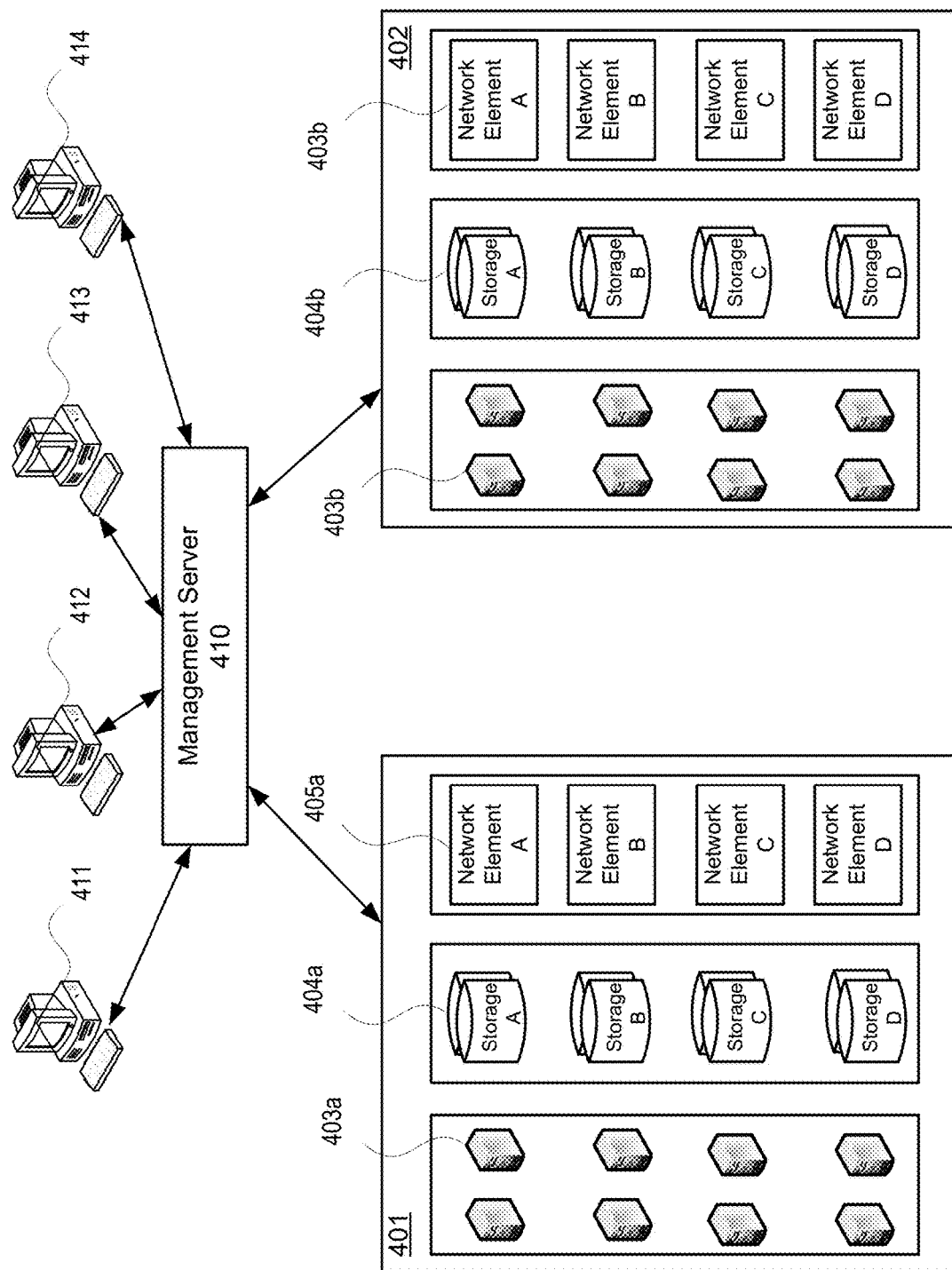
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403, storage resources 404, and network resources 405) of the cloud system.

Management server 410 may be implemented on one or more physical servers. The management server 410 may run, for example, CLOUDSTACK, or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system. For example, the management server 410 may provide a set of application programming interfaces (APIs) and/or one or more cloud operator console applications (e.g., web-based on standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management sever 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Enterprise Mobility Management Architecture

Figure 5:
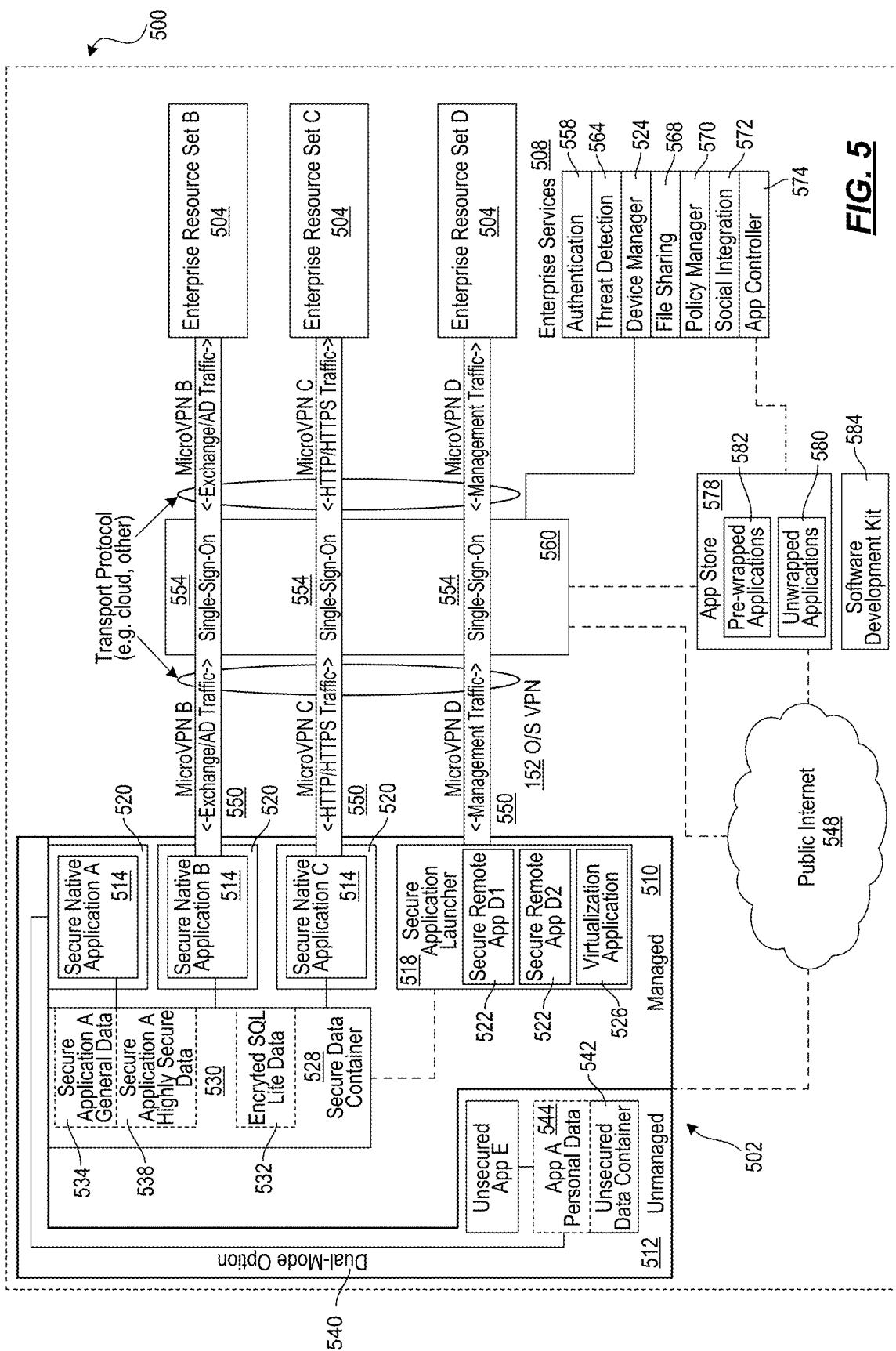
FIG. 5 depicts an illustrative enterprise mobility management system.

FIG. 5 represents an enterprise mobility technical architecture 500 for use in a BYOD environment. The architecture enables a user of a mobile device 502 to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to user. The user may utilize the mobile device 502 for business use only or for business and personal use. The mobile device may run an iOS operating system, and Android operating system, or the like. The enterprise may choose to implement policies to manage the mobile device 504. The policies may be implanted through a firewall or gateway in such a way that the mobile device may be identified, secured or security verified, and provided selective or full access to the enterprise resources. The policies may be mobile device management policies, mobile application management policies, mobile data management policies, or some combination of mobile device, application, and data management policies. A mobile device 504 that is managed through the application of mobile device management policies may be referred to as an enrolled device.

In some embodiments, the operating system of the mobile device may be separated into a managed partition 510 and an unmanaged partition 512. The managed partition 510 may have policies applied to it to secure the applications running on and data stored in the managed partition. The applications running on the managed partition may be secure applications. In other embodiments, all applications may execute in accordance with a set of one or more policy files received separate from the application, and which define one or more security parameters, features, resource restrictions, and/or other access controls that are enforced by the mobile device management system when that application is executing on the device. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple apps as described herein (virtual partition). Stated differently, by enforcing policies on managed apps, those apps may be restricted to only be able to communicate with other managed apps and trusted enterprise resources, thereby creating a virtual partition that is impenetrable by unmanaged apps and devices.

The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies that are executed on the mobile device 502 when the secure native application is executed on the device. The secure application wrapper 520 may include meta-data that points the secure native application 514 running on the mobile device 502 to the resources hosted at the enterprise that the secure native application 514 may require to complete the task requested upon execution of the secure native application 514. The secure remote applications 522 executed by a secure application launcher 518 may be executed within the secure application launcher application 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a graphical user interface (GUI) and communicate them to a server application where the server application will use the user interaction data as an input to the application operating on the server. In this arrangement, an enterprise may elect to maintain the application on the server side as well as data, files, etc. associated with the application. While an enterprise may elect to "mobilize" some applications in accordance with the principles herein by securing them for deployment on the mobile device, this arrangement may also be elected for certain applications. For example, while some applications may be secured for use on the mobile device, others might not be prepared or appropriate for deployment on the mobile device so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device as well as a virtualization application to allow access to applications that are deemed more properly operated on the server side. In an embodiment, the virtualization application may store some data, files, etc. on the mobile phone in one of the secure storage locations. An enterprise, for example, may elect to allow certain information to be stored on the phone while not permitting other information.

In connection with the virtualization application, as described herein, the mobile device may have a virtualization application that is designed to present GUIs and then record user interactions with the GUI. The application may communicate the user interactions to the server side to be used by the server side application as user interactions with the application. In response, the application on the server side may transmit back to the mobile device a new GUI. For example, the new GUI may be a static page, a dynamic page, an animation, or the like, thereby providing access to remotely located resources.

The secure applications may access data stored in a secure data container 528 in the managed partition 510 of the mobile device. The data secured in the secure data container may be accessed by the secure wrapped applications 514, applications executed by a secure application launcher 522, virtualization applications 526 executed by a secure application launcher 522, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as Advanced Encryption Standard (AES) 128-bit encryption or the like, while highly secure data 538 may use a very strong form of encryption such as AES 256-bit encryption. Data stored in the secure data container 528 may be deleted from the device upon receipt of a command from the device manager 524. The secure applications may have a dual-mode option 540. The dual mode option 540 may present the user with an option to operate the secured application in an unsecured or unmanaged mode. In an unsecured or unmanaged mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 548 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device may connect to enterprise resources 504 and enterprise services 508 at an enterprise, to the public Internet 548, and the like. The mobile device may connect to enterprise resources 504 and enterprise services 508 through virtual private network connections. The virtual private network connections, also referred to as microVPN or application-specific VPN, may be specific to particular applications 550, particular devices, particular secured areas on the mobile device, and the like 552. For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the mobile device 502. The access gateway may also re-route traffic from the mobile device 502 to the public Internet 548, enabling the mobile device 502 to access publicly available and unsecured applications that run on the public Internet 548. The mobile device may connect to the access gateway via a transport network 562. The transport network 562 may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 504 may be premise-based resources, cloud based resources, and the like. The enterprise resources 504 may be accessed by the mobile device 502 directly or through the access gateway 560. The enterprise resources 504 may be accessed by the mobile device 502 via a transport network 562. The transport network 562 may be a wired network, wireless network, cloud network, local area network, metropolitan area network, wide area network, public network, private network, and the like.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services and the like. Authentication services 558 may use certificates. The certificates may be stored on the mobile device 502, by the enterprise resources 504, and the like. The certificates stored on the mobile device 502 may be stored in an encrypted location on the mobile device, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store may be provided with an intuitive and easy to use User Interface.

A software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and analytics capability 588. The management and analytics capability 588 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 6:
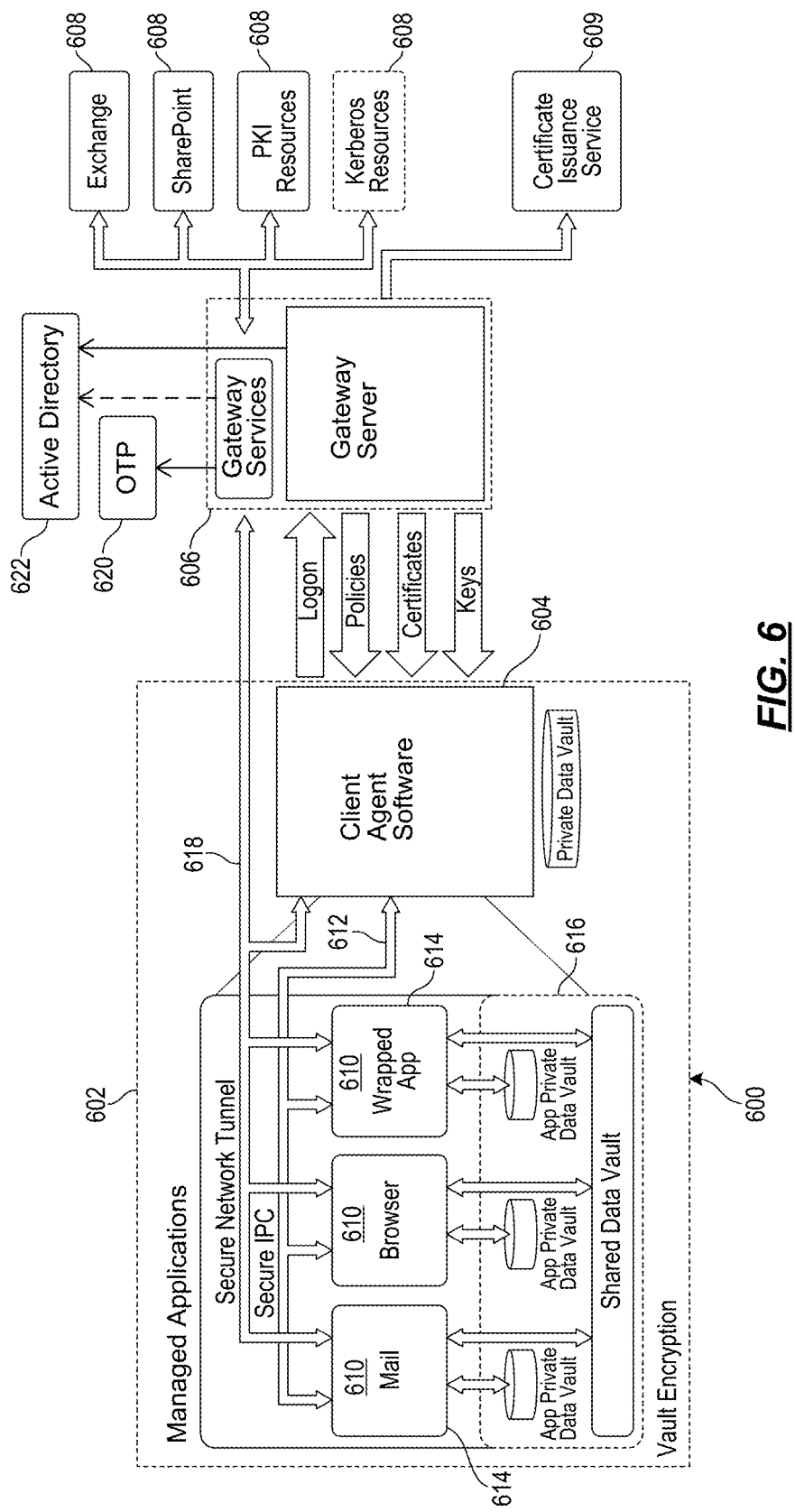
FIG. 6 depicts another illustrative enterprise mobility management system.

FIG. 6 is another illustrative enterprise mobility management system 600. Some of the components of the mobility management system 500 described above with reference to FIG. 5 have been omitted for the sake of simplicity. The architecture of the system 600 depicted in FIG. 6 is similar in many respects to the architecture of the system 500 described above with reference to FIG. 5 and may include additional features not mentioned above.

In this case, the left hand side represents an enrolled mobile device 602 with a client agent 604, which interacts with gateway server 606 (which includes Access Gateway and application controller functionality) to access various enterprise resources 608 and services 609 such as Exchange, Sharepoint, public-key infrastructure (PKI) Resources, Kerberos Resources, Certificate Issuance service, as shown on the right hand side above. Although not specifically shown, the mobile device 602 may also interact with an enterprise application store (StoreFront) for the selection and downloading of applications.

The client agent 604 acts as the UI (user interface) intermediary for Windows apps/desktops hosted in an Enterprise data center, which are accessed using the High-Definition User Experience (HDX)/ICA display remoting protocol. The client agent 604 also supports the installation and management of native applications on the mobile device 602, such as native iOS or Android applications. For example, the managed applications 610 (mail, browser, wrapped application) shown in the figure above are all native applications that execute locally on the device. Client agent 604 and application management framework of this architecture act to provide policy driven management capabilities and features such as connectivity and SSO (single sign on) to enterprise resources/services 608. The client agent 604 handles primary user authentication to the enterprise, normally to Access Gateway (AG) with SSO to other gateway server components. The client agent 604 obtains policies from gateway server 606 to control the behavior of the managed applications 610 on the mobile device 602.

The secure interprocess communication (IPC) links 612 between the native applications 610 and client agent 604 represent a management channel, which allows client agent to supply policies to be enforced by the application management framework 614 "wrapping" each application. The IPC channel 612 also allows client agent 604 to supply credential and authentication information that enables connectivity and SSO to enterprise resources 608. Finally, the IPC channel 612 allows the application management framework 614 to invoke user interface functions implemented by client agent 604, such as online and offline authentication.

Communications between the client agent 604 and gateway server 606 are essentially an extension of the management channel from the application management framework 614 wrapping each native managed application 610. The application management framework 614 requests policy information from client agent 604, which in turn requests it from gateway server 606. The application management framework 614 requests authentication, and client agent 604 logs into the gateway services part of gateway server 606 (also known as NetScaler Access Gateway). Client agent 604 may also call supporting services on gateway server 606, which may produce input material to derive encryption keys for the local data vaults 616, or provide client certificates which may enable direct authentication to PKI protected resources, as more fully explained below.

In more detail, the application management framework 614 "wraps" each managed application 610. This may be incorporated via an explicit build step, or via a post-build processing step. The application management framework 614 may "pair" with client agent 604 on first launch of an application 610 to initialize the Secure IPC channel and obtain the policy for that application. The application management framework 614 may enforce relevant portions of the policy that apply locally, such as the client agent login dependencies and some of the containment policies that restrict how local OS services may be used, or how they may interact with the application 610.

The application management framework 614 may use services provided by client agent 604 over the Secure IPC channel 612 to facilitate authentication and internal network access. Key management for the private and shared data vaults 616 (containers) may be also managed by appropriate interactions between the managed applications 610 and client agent 604. Vaults 616 may be available only after online authentication, or may be made available after offline authentication if allowed by policy. First use of vaults 616 may require online authentication, and offline access may be limited to at most the policy refresh period before online authentication is again required.

Network access to internal resources may occur directly from individual managed applications 610 through Access Gateway 606. The application management framework 614 is responsible for orchestrating the network access on behalf of each application 610. Client agent 604 may facilitate these network connections by providing suitable time limited secondary credentials obtained following online authentication. Multiple modes of network connection may be used, such as reverse web proxy connections and end-to-end VPN-style tunnels 618.

The Mail and Browser managed applications 610 have special status and may make use of facilities that might not be generally available to arbitrary wrapped applications. For example, the Mail application may use a special background network access mechanism that allows it to access Exchange over an extended period of time without requiring a full AG logon. The Browser application may use multiple private data vaults to segregate different kinds of data.

This architecture supports the incorporation of various other security features. For example, gateway server 606 (including its gateway services) in some cases will not need to validate active directory (AD) passwords. It can be left to the discretion of an enterprise whether an AD password is used as an authentication factor for some users in some situations. Different authentication methods may be used if a user is online or offline (i.e., connected or not connected to a network).

Step up authentication is a feature wherein gateway server 606 may identify managed native applications 610 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 616 (containers) on the mobile device 602. The vaults 616 may be encrypted so that all on-device data including files, databases, and configurations are protected. For on-line vaults, the keys may be stored on the server (gateway server 606), and for off-line vaults, a local copy of the keys may be protected by a user password or biometric validation. When data is stored locally on the device 602 in the secure container 616, it is preferred that a minimum of AES 256 encryption algorithm be utilized.

Other secure container features may also be implemented. For example, a logging feature may be included, wherein all security events happening inside an application 610 are logged and reported to the backend. Data wiping may be supported, such as if the application 610 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key if the specific initialization vector used to encrypt the data is not known. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 614 may be prevented in other ways. For example, when an application 610 is put in the background, the memory may be cleared after a predetermined (configurable)

time period. When backgrounded, a snapshot may be taken of the last displayed screen of the application to fasten the foregrounding process. The screenshot may contain confidential data and hence should be cleared.

Another security feature relates to the use of an OTP (one time password) 620 without the use of an AD (active directory) 622 password for access to one or more applications. In some cases, some users do not know (or are not permitted to know) their AD password, so these users may authenticate using an OTP 620 such as by using a hardware OTP system like SecurID (OTPs may be provided by different vendors also, such as Entrust or Gemalto). In some cases, after a user authenticates with a user ID, a text is sent to the user with an OTP 620. In some cases, this may be implemented only for online use, with a prompt being a single field.

An offline password may be implemented for offline authentication for those applications 610 for which offline use is permitted via enterprise policy. For example, an enterprise may want StoreFront to be accessed in this manner. In this case, the client agent 604 may require the user to set a custom offline password and the AD password is not used. Gateway server 606 may provide policies to control and enforce password standards with respect to the minimum length, character class composition, and age of passwords, such as described by the standard Windows Server password complexity requirements, although these requirements may be modified.

Another feature relates to the enablement of a client side certificate for certain applications 610 as secondary credentials (for the purpose of accessing PKI protected web resources via the application management framework micro VPN feature). For example, an application may utilize such a certificate. In this case, certificate-based authentication using ActiveSync protocol may be supported, wherein a certificate from the client agent 604 may be retrieved by gateway server 606 and used in a keychain. Each managed application may have one associated client certificate, identified by a label that is defined in gateway server 606.

Gateway server 606 may interact with an Enterprise special purpose web service to support the issuance of client certificates to allow relevant managed applications to authenticate to internal PKI protected resources.

The client agent 604 and the application management framework 614 may be enhanced to support obtaining and using client certificates for authentication to internal PKI protected network resources. More than one certificate may be supported, such as to match various levels of security and/or separation requirements. The certificates may be used by the Mail and Browser managed applications, and ultimately by arbitrary wrapped applications (provided those applications use web service style communication patterns where it is reasonable for the application management framework to mediate https requests).

Application management client certificate support on iOS may rely on importing a public-key cryptography standards (PKCS) 12 BLOB (Binary Large Object) into the iOS keychain in each managed application for each period of use. Application management framework client certificate support may use a HTTPS implementation with private in-memory key storage. The client certificate will never be present in the iOS keychain and will not be persisted except potentially in "online-only" data value that is strongly protected.

Mutual SSL may also be implemented to provide additional security by requiring that a mobile device 602 is authenticated to the enterprise, and vice versa. Virtual smart cards for authentication to gateway server 606 may also be implemented.

Both limited and full Kerberos support may be additional features. The full support feature relates to an ability to do full Kerberos login to Active Directory (AD) 622, using an AD password or trusted client certificate, and obtain Kerberos service tickets to respond to HTTP Negotiate authentication challenges. The limited support feature relates to constrained delegation in Citrix Access Gateway Enterprise Edition (AGEE), where AGEE supports invoking Kerberos protocol transition so it can obtain and use Kerberos service tickets (subject to constrained delegation) in response to HTTP Negotiate authentication challenges. This mechanism works in reverse web proxy (aka corporate virtual private network (CVPN)) mode, and when http (but not https) connections are proxied in VPN and MicroVPN mode.

Another feature relates to application container locking and wiping, which may automatically occur upon jail-break or rooting detections, and occur as a pushed command from administration console, and may include a remote wipe functionality even when an application 610 is not running.

A multi-site architecture or configuration of enterprise application store and an application controller may be supported that allows users to be service from one of several different locations in case of failure.

In some cases, managed applications 610 may be allowed to access a certificate and private key via an API (example OpenSSL). Trusted managed applications 610 of an enterprise may be allowed to perform specific Public Key operations with an application's client certificate and private key. Various use cases may be identified and treated accordingly, such as when an application behaves like a browser and no certificate access is required, when an application reads a certificate for "who am I," when an application uses the certificate to build a secure session token, and when an application uses private keys for digital signing of important data (e.g. transaction log) or for temporary data encryption.

Figure 7:
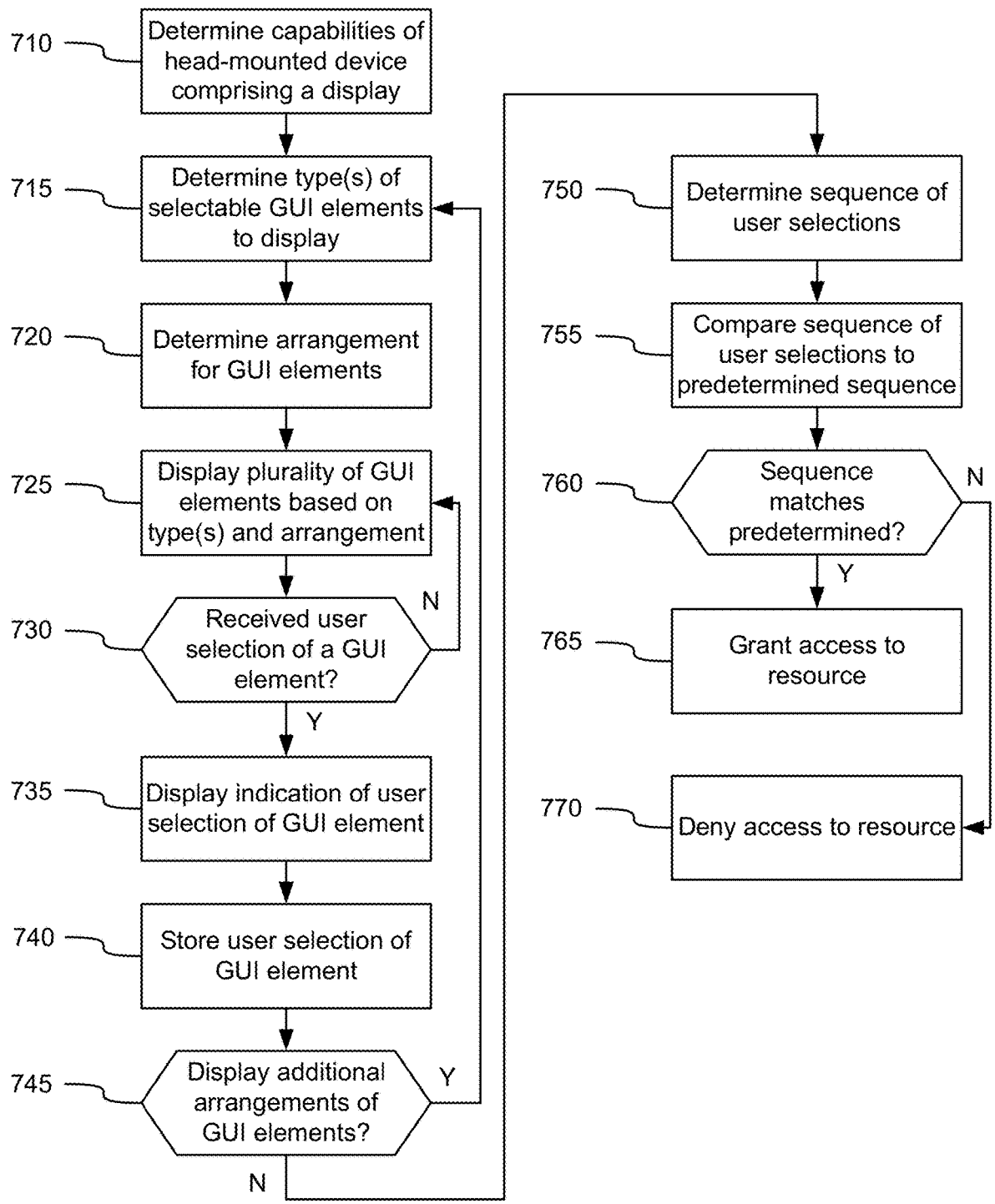
FIG. 7 illustrates an example method of securely entering credentials via a head-mounted display device in accordance with one or more illustrative aspects described herein.

FIG. 7 illustrates an example method of securely entering credentials via a head-mounted display device in accordance with one or more illustrative aspects described herein. A head-mounted display device may comprise, for example, a virtual reality (VR) headset, an augmented reality (AR) headset, or a headset comprising both VR and AR capabilities. In some aspects, the head-mounted display device may comprise the client computer 107 or 109, client device 240, client computer 411-414, mobile device 502, or mobile device 602 previously described. The head-mounted display device may comprise a display for displaying one or more graphical user interface (GUI) elements, computer-generated simulations, or other images. For example, the display may display one or more selectable GUI elements (e.g., numbers, letters, special characters, colors, and the like), which may be used by the user of the head-mounted display device to securely enter user credentials. The head-mounted display device may also comprise one or more optical elements, such as lenses, so that the user can view at least a portion of the surrounding environment. GUI elements may be displayed (e.g., overlaid) over the surrounding environment.

The head-mounted display device may also comprise one or more shields that surround the display of the head-mounted display device. The shield may provide privacy to the wearer of the head-mounted display device, such as when the wearer is providing credentials to access one or more resources. In some aspects, the head-mounted display device may comprise a smartphone (or other user device having a display) that is placed within or attached to a headset having one or more shields. The head-mounted display device may have one or more buttons (e.g., physical buttons or touchscreen buttons) to receive user selections or other user inputs. Additionally or alternatively, the head-mounted display device may be paired or otherwise associated with an input device having one or more buttons for receiving user inputs (e.g., a remote control or a clicker).

The head-mounted display device may have one or more sensors. For example, the device may comprise one or more front-facing cameras and/or one or more rear-facing cameras. In some aspects, the rear-facing camera(s) may be used to track the user's eyes, such as the user's gaze direction (e.g., left, right, top, bottom, top left, bottom right, etc.). The user's gaze may be used to select a GUI element displayed on the display of the head-mounted display device, such as when inputting a password or other credential. The front-facing camera(s) may be used to capture images and/or video to determine gestures performed by the user, such as a walking gesture or a hand gesture. The device may include one or more accelerometers, one or more gyroscopic sensors, and/or one or more magnetometers to measure and calculate the user's gestures and movement. For example, the accelerometer(s) may be used to measure the acceleration of the user's head, and the gyroscopic sensor(s) may be used to measure the rotational rate of the user's head. The accelerometer(s) and/or gyroscopic sensor(s) may also be used to calculate the user's walking gestures, such as if the GUI elements are provided at varying depths, as will be described in further detail below. The magnetometer(s) may be used to calculate a frame of reference for calculating the user's movement. In some aspects, the user may use a gesture (e.g., an eye movement, a head movement, and/or a hand movement) to choose a GUI element. The user may then press a button on an input device to select or confirm the chosen GUI element. Alternatively, the GUI element may be automatically selected once the user chooses the GUI element by gesture. In some aspects, the user may blink with one or two eyes, and a rear-facing camera of the head-mounted display device may capture the blink to identify a selection of a GUI element.

In step 710, the capabilities of a head-mounted computing device may be determined. In some aspects, the capabilities of the head-mounted computing device may be used to determine the type(s) and/or arrangement(s) for displaying the GUI elements to the viewer. The greater the number of sensors the head-mounted computing device has, the more options the computing device may have for arranging the GUI elements. For example, the head-mounted computing device might not have accelerometers, gyroscopes, and/or front-facing cameras, and thus might not be able to detect head or hand gestures made by the user. The computing device may determine to display the GUI elements in a manner in which the user can select a GUI element using the capabilities (e.g., sensors) that the head-mounted computing device does have. For example, if the head-mounted computing device has one or more buttons (e.g., on a remote control or on the head-mounted computing device), the head-mounted computing device may use a scrolling-type arrangement in which the display automatically scrolls through each individual GUI element (e.g., without user input), and the user is able to select the correct GUI element using one or more buttons while the automatic scrolling feature scrolls through the GUI elements. An example of a scrolling-type arrangement will be described in further detail below, such as with reference to FIG. 9C.

If the head-mounted computing device has one or more rear-facing cameras, the head-mounted computing device may arrange the GUI elements in a manner which the user may easily select GUI elements by blinking the left eye and/or right eye. For example, the head-mounted computing device may display two GUI elements, and the user may select the left element my blinking the left eye and select the right element by blinking the right eye. The head-mounted computing device may alternatively display three GUI elements, and the user may select the left element my blinking the left eye, select the right element by blinking the right eye, and select the middle element by blinking both eyes. Various other arrangements and/or numbers of GUI elements may be displayed, and the user may select each GUI element with two blinks, three blinks, etc. The head-mounted computing device may also arrange the GUI elements in a manner which the user can select GUI elements based on the user's gaze (e.g., a gaze up to select the top GUI element, a gaze down to select the bottom GUI element, a gaze to the left to select the left GUI element, and so on). As yet another example, if the head-mounted computing device has a black and white display (but not a color display), the head-mounted computing device may display black and white GUI elements (e.g., characters) and might not display color GUI elements. The head-mounted computing device may also display patterns instead of colors.

In step 715, the head-mounted computing device may determine the type(s) of selectable graphical user interface (GUI) elements to display on a display of the head-mounted computing device. In some aspects, GUI elements may indicate different colors (e.g., blue, green, red, yellow, orange, and the like). For example, each element of a plurality of GUI elements displayed on the display of the head-mounted computing device may indicate a different color of a plurality of different colors. In some aspects, GUI elements may indicate different characters (e.g., numbers, letters, punctuation marks, and the like). For example, each element of a plurality of GUI elements displayed on the display of the head-mounted computing device may indicate a different character of a plurality of different characters (e.g., 1, 2, @, #, B, M, and the like). Examples of arrangements having different characters will be described in further detail below, such as with reference to FIGS. 9A-D. In some aspects, GUI elements may indicate different combinations of colors and characters. For example, one GUI element may be blue without a character, another element may indicate the letter "N" without a color, and another element may indicate the number "1" without a color. In yet another example, one GUI element may be blue and may indicate the number "3," and another element may also indicate the number "3" but without a color. The more complexity introduced (e.g., a combination of numbers, letters, special characters), the more secure the user's password may be, such as from brute force attacks. As previously described, the privacy afforded by a head-mounted computing device (which may be shielded from onlookers) may make brute force attacks on the password difficult or impossible because the password entry is seen only by the headset wearer and/or the headset may change arrangements of the displayed characters and/or colors during password entry, as will be described in further detail below.

In step 720, the head-mounted computing device may determine an arrangement in which to display the plurality of GUI elements on the display of the head-mounted computing device. As previously discussed, the arrangement selected may be based on the capabilities of the head-mounted computing device (e.g., sensor capabilities). For example, the head-mounted computing device may display the GUI elements using a scrolling-type arrangement or other arrangement based on the sensor capabilities.

Figure 9A:
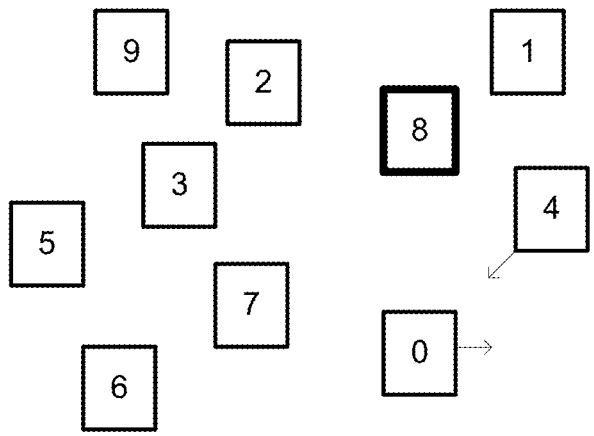
FIG. 9A illustrates an exemplary arrangement of graphical user interface elements for securely entering or setting up credentials via a head-mounted display device in accordance with one or more illustrative aspects described herein.

FIG. 9A illustrates an exemplary arrangement 910 of graphical user interface elements for securely entering or setting up credentials via a head-mounted display device in accordance with one or more illustrative aspects described herein. In some aspects, the GUI elements may comprise rectangular panels (or panels of other shapes). Each of the GUI elements may indicate a different number (e.g., 1, 2, 3, etc.). As previously described, the GUI elements may comprise different colors, numbers, letters, special characters, and the like. The arrangement of the GUI elements on the display of the head-mounted display device may comprise a random arrangement. In some aspects, one or more of the panels may move (e.g., float) around the display screen as the panels are displayed to the user. For example, FIG. 9A illustrates the "4" panel floating to the bottom left and the "0" panel floating to the right. One or more panels may remain stationary and one or more other panels may be moving while the panels are displayed to the user. In some aspects, the panel that the user has selected (e.g., by actuating a button, head gesture, hand gesture, eye blink, or a combination thereof) may be highlighted (e.g., panel "8" in the exemplary arrangement 910).

Figure 9B:
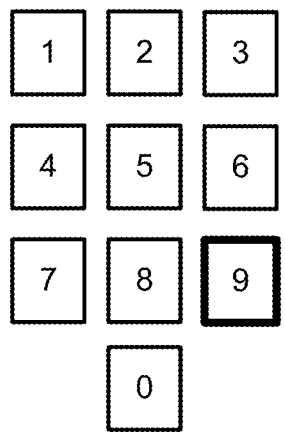
FIG. 9B illustrates an exemplary arrangement of graphical user interface elements for securely entering or setting up credentials via a head-mounted display device in accordance with one or more illustrative aspects described herein.

FIG. 9B illustrates an exemplary arrangement 920 of graphical user interface elements for securely entering or setting up credentials via a head-mounted display device in accordance with one or more illustrative aspects described herein. The GUI elements may be arranged in a grid format or another structured format. For example (and as illustrated in FIG. 9B), the GUI elements may comprise a plurality of nine grids, and the grids may be placed in numerical order or another order familiar to users. The panel that the user has selected may be highlighted (e.g., panel "9" in the arrangement 920).

Figure 9C:
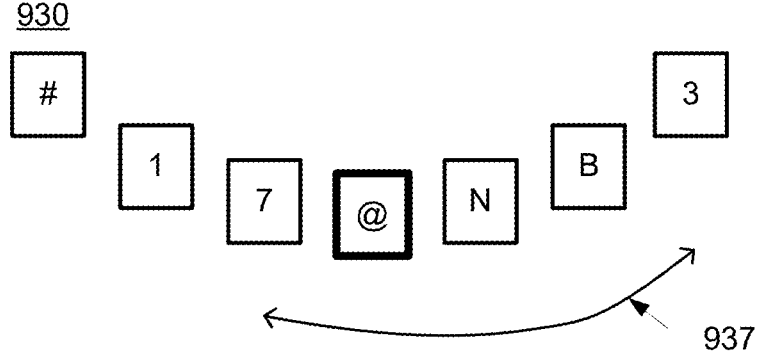
FIG. 9C illustrates an exemplary arrangement of graphical user interface elements for securely entering or setting up credentials via a head-mounted display device in accordance with one or more illustrative aspects described herein.

FIG. 9C illustrates an exemplary arrangement 930 of graphical user interface elements for securely entering or setting up credentials via a head-mounted display device in accordance with one or more illustrative aspects described herein. In some aspects, the GUI elements may be arranged in a row format and/or may indicate a plurality of different types of characters. For example, the exemplary arrangement 930 comprises panels (e.g., panel "#," panel "1," panel "7," panel "@," panel "N," panel "B," and panel "3") in a row format. While the panels in the exemplary arrangement 930 indicate a mix of characters, the panels may indicate just numbers, just letters, just special characters, just colors, and so forth. Moreover, the numbers or letters may be arranged, respectively, in numerical order or alphabetical order or may be arranged in a random order. Additionally or alternatively, the head-mounted computing device may display the panels in a scrolling-type arrangement. For example (and as illustrated in FIG. 9C by the arrow 937), the display may automatically scroll through and highlight each individual panel from left to right (e.g., first highlight panel "1," then highlight panel "7," then highlight panel "@," and so forth) or from right to left (e.g., first highlight panel "B," then highlight panel "N," then highlight panel "@," and so forth). The head-mounted computing device may scroll through and highlight the panels without user input (e.g., gestures), so that the user is able to select a panel using one or more buttons on a paired remote control or on the head-mounted computing device. The head-mounted computing device may also automatically scroll through and highlight the panels in the exemplary arrangement 910 illustrated in FIG. 9A or the panels in the exemplary arrangement 920 illustrated in FIG. 9B. For example and with reference to FIG. 9B, the computing device may first highlight panel "1," then panel "2," then panel "3," then panel "4," and so on until all of the panels have been highlighted or the user has selected a panel. Alternatively, the computing device may highlight the panels in a random order. Automatic scrolling may be advantageous when the head-mounted computing device does not have sensors used to capture user gestures, such as gyroscopes, accelerometers, front-facing cameras, and the like.

In some aspects, the head-mounted computing device may configure the speed at which it scrolls through the panels. For example, the computing device may highlight each panel for 1 second, 1.5 seconds, 2 seconds, and so forth. Moreover, within the same arrangement, the computing device may highlight each panel for a different amount of time. For example and with reference to FIG. 9C, the computing device may highlight panel "#" for 1 second, panel "1" for 1 second, panel "7" for 2 seconds, panel "@" for 1.5 seconds, panel "N" for 0.5 seconds, and so on. By highlighting each panel for a different amount of time, the head-mounted computing device may improve the data security of the user's credentials by preventing shoulder surfers or other viewers from memorizing and copying the user's button selections and/or gestures. Similarly, the head-mounted computing device may improve the data security of the user's credentials by displaying the panels in a random order and/or arrangement or by changing the order and/or arrangement each time panels are displayed to the user.

Figure 9D:
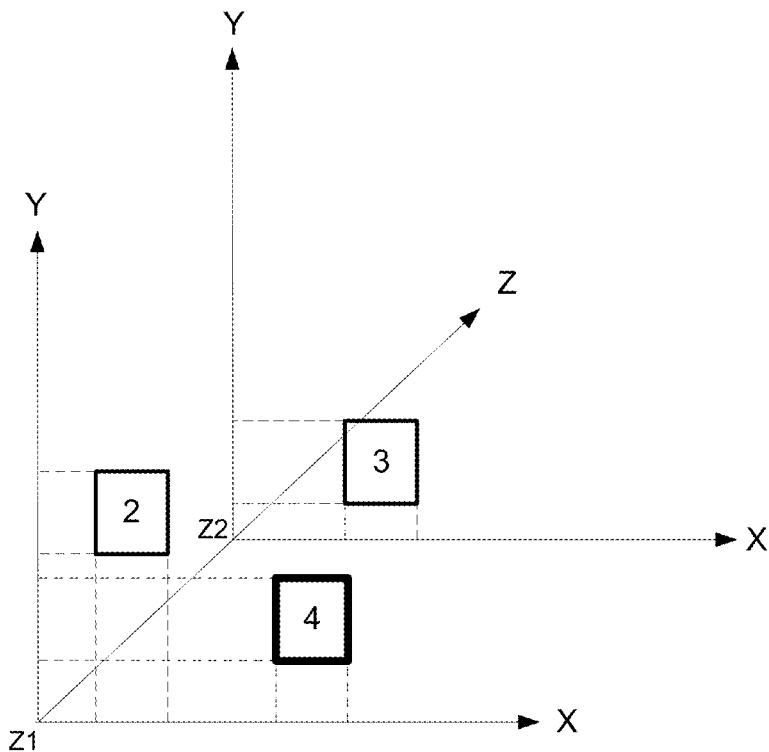
FIG. 9D illustrates an exemplary arrangement of graphical user interface elements for securely entering or setting up credentials via a head-mounted display device in accordance with one or more illustrative aspects described herein.

FIG. 9D illustrates an exemplary arrangement 940 of graphical user interface elements for securely entering or setting up credentials via a head-mounted display device in accordance with one or more illustrative aspects described herein. In some aspects, GUI elements (e.g., panels) may be displayed to the user at different virtual depths. For example, panels "2" and "4" may be displayed at a first depth Z1, and the panels may visually appear closer to the user. Panel "3" may be displayed at a second depth Z2, and the panel may visually appear farther away from the user. As illustrated in FIG. 9D, panel "4" may currently be selected by the user. If the user desires to select panel "3," the user may walk forward or reach out with one or two hands to reach panels at the second depth Z2. The accelerometer(s), gyroscope(s), and/or front-facing camera(s) may capture the user's movement and register the user's movement as a new selection of panel "3." In some aspects, panels "2" and "4" may disappear from the display if the user steps forward to select panel "3," but may reappear if the user subsequently steps backward. While the panels illustrated in FIG. 9D indicate numbers, the panels may indicate any characters or colors.

Figure 10A:
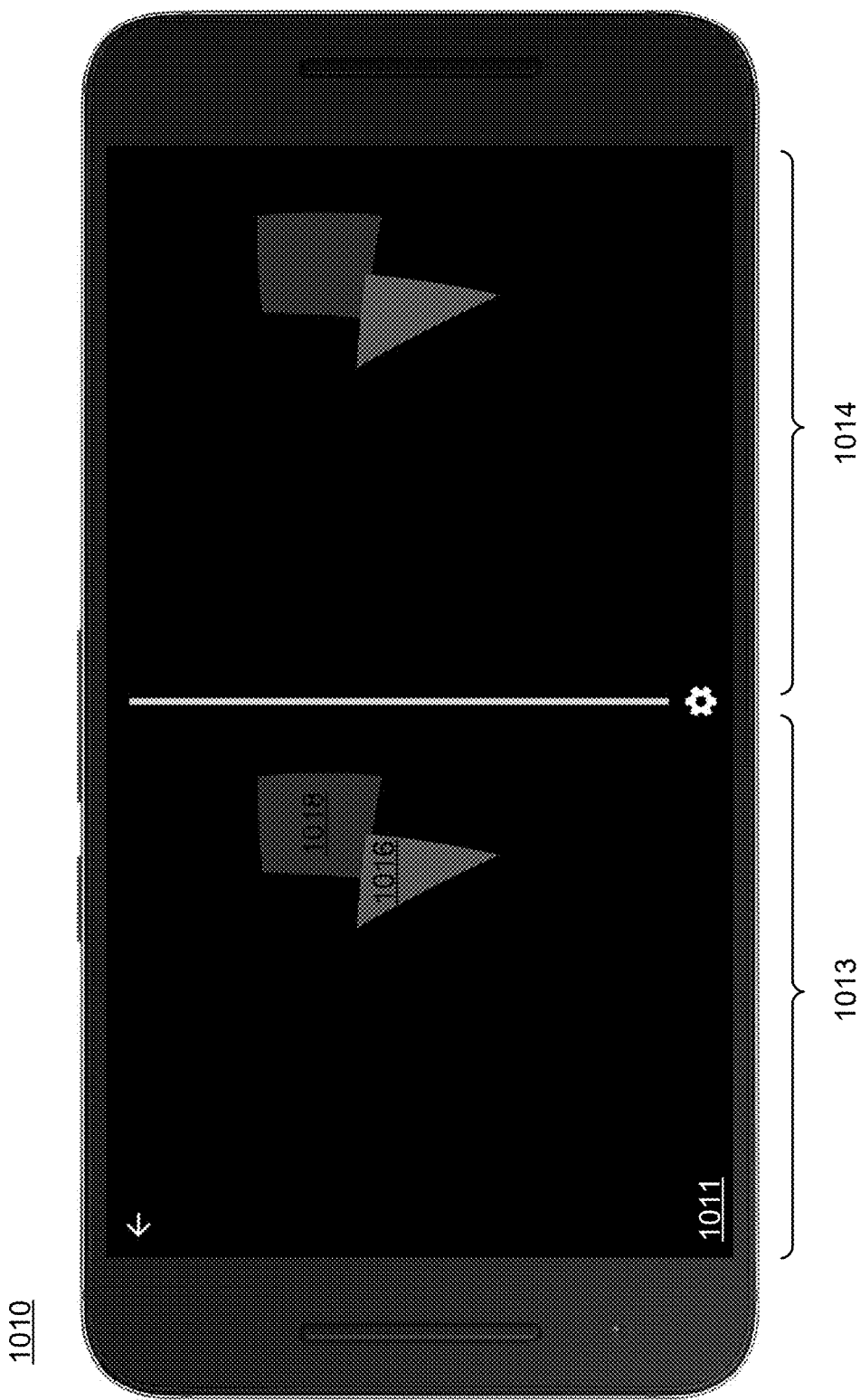
FIG. 10A illustrates an exemplary arrangement of graphical user interface elements for securely entering or setting up credentials via a head-mounted display device in accordance with one or more illustrative aspects described herein.

FIG. 10A illustrates an exemplary arrangement 1010 of graphical user interface elements for securely entering or setting up credentials via a head-mounted display device in accordance with one or more illustrative aspects described herein. The arrangement 1010 of GUI elements may be displayed on a display screen 1011, such as a display of a smartphone (which may be placed in or on a headset having one or more shields), a display of a virtual or augmented reality headset, or a display of another user device. The display screen 1011 may be divided into two portions 1013 and 1014 (e.g., halves) for each eye. The two portions 1013 and 1014 may be used to create the effect of a three-dimensional (3D) environment for the viewer. The left portion 1013 for the left eye may display a GUI element 1016 and a GUI element 1018. For example, the GUI element 1016 may be a certain color, such as orange. The GUI element 1018 may be a different color, such as red. The right portion 1014 for the right eye may display the same GUI elements, but the GUI elements displayed on the right portion 1014 may be shifted relative to (or otherwise oriented differently from) the GUI elements 1016 and 1018 on the left portion 1013 to create a 3D effect and/or an effect that the elements 1016 and 1018 are at different depths. The user may select one of the elements (e.g., element 1016) by gesture, actuating a button, or other user input. In response to the user selecting element 1016, the display device may highlight element 1016 to the user. As previously described, the GUI elements 1016 and 1018 may comprise different numbers (or other characters), instead of different colors.

Figure 10B:
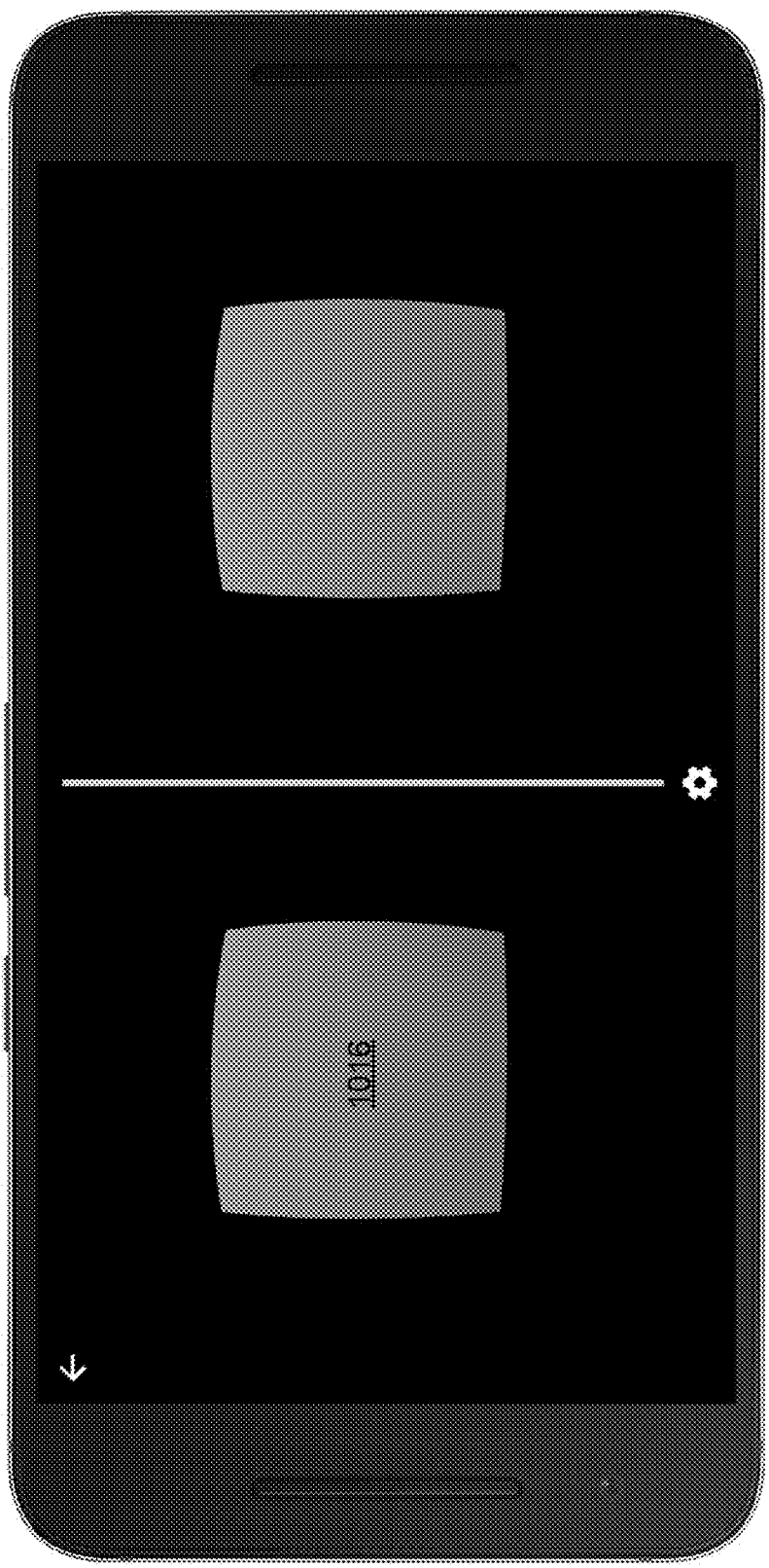
FIG. 10B illustrates an exemplary arrangement of graphical user interface elements for securely entering or setting up credentials via a head-mounted display device in accordance with one or more illustrative aspects described herein.

FIG. 10B illustrates an exemplary arrangement 1020 of graphical user interface elements for securely entering or setting up credentials via a head-mounted display device in accordance with one or more illustrative aspects described herein. In some aspects, the arrangement 1020 may be displayed in response to the user's selection of element 1016 in the arrangement 1010 illustrated in FIG. 10A. For example, the display device may highlight the GUI element 1016 by enlarging the selected element, bringing the selected element to the foreground, not displaying unselected elements, etc. As previously described, the element 1016 may be displayed on both the left and right portions of the display screen, but at different orientations.

Figure 10C:
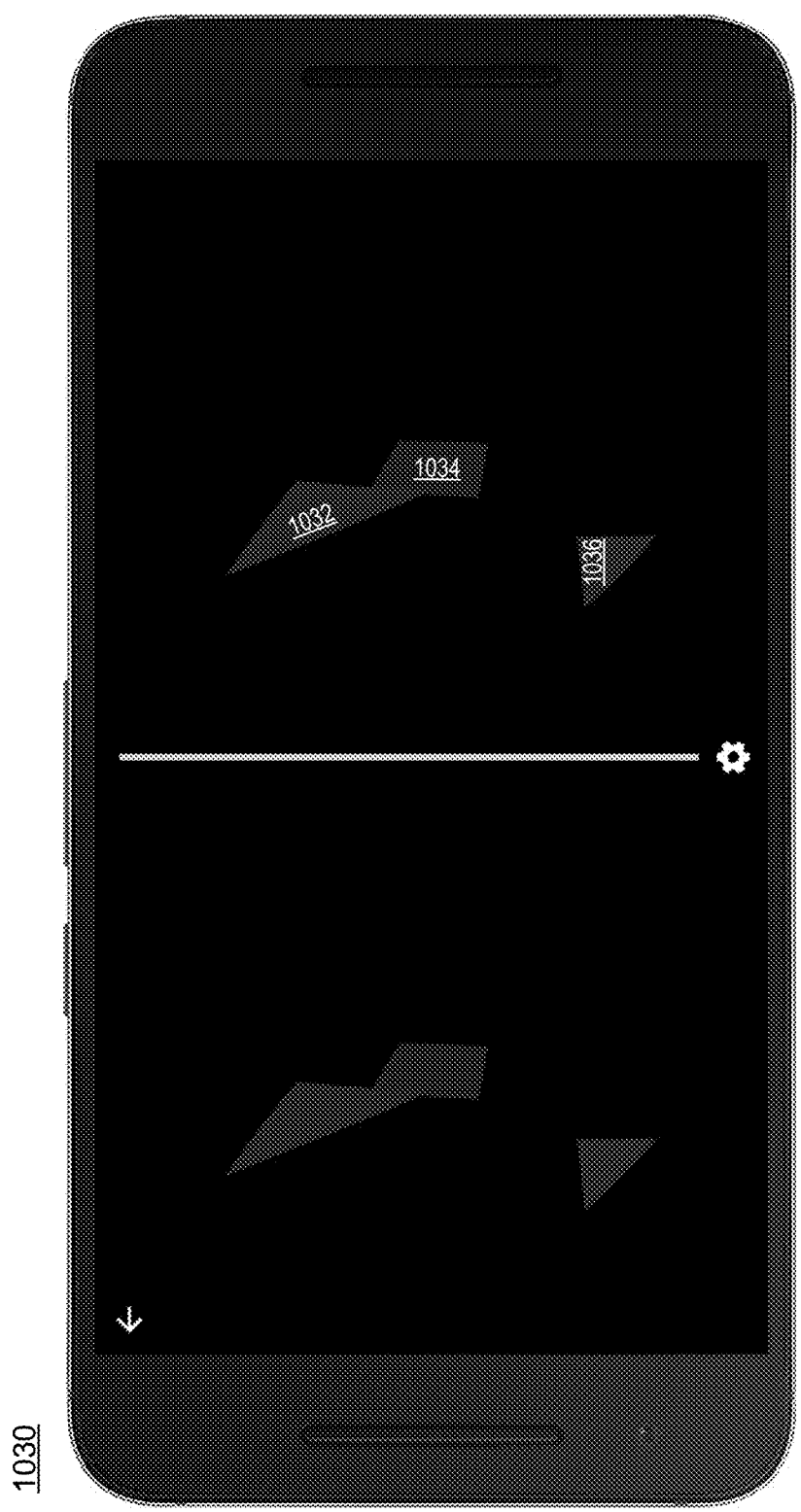
FIG. 10C illustrates an exemplary arrangement of graphical user interface elements for securely entering or setting up credentials via a head-mounted display device in accordance with one or more illustrative aspects described herein.

FIG. 10C illustrates an exemplary arrangement 1030 of graphical user interface elements for securely entering or setting up credentials via a head-mounted display device in accordance with one or more illustrative aspects described herein. The arrangement 1030 may comprise three GUI elements 1032, 1034, and 1036. The GUI elements may comprise different colors and/or indicate different characters. For example, GUI element 1032 may be green, GUI element 1034 may be blue, and GUI element 1036 may be red. In some aspects, the GUI elements 1032, 1034, and 1036 may be displayed during the same password entry session as GUI elements 1016 and 1018 displayed in FIG. 10A. For example, elements 1032, 1034, and 1036 may be virtually located to the right of elements 1016 and 1018, and the user may turn his or her head (and consequently the head-mounted computing device) to the right until the elements 1032, 1034, and 1036 pop into view (and the elements 1016 and 1018 disappear from view). The user may select one of the elements 1032, 1034, or 1036 by gesture, pressing a button, etc. The user may similarly turn his or her head to the left, relative to the GUI elements 1016 and 1018 displayed in FIG. 10A, and other selectable GUI elements may be displayed to the user. For example, the user may turn 90 degrees to the left. The user may also look up and/or down, and different GUI elements may be displayed depending on where the user looks. Therefore, GUI elements may be displayed in the space surrounding the user. By spreading the selectable GUI elements in the space surrounding the user, the head-mounted computing device may advantageously improve the accuracy of selecting GUI elements and/or may allow the display of more GUI elements, which may increase the security of the user's credentials.

Returning to FIG. 7, in step 725, the head-mounted computing device may display a plurality of GUI elements on the display of the head-mounted computing device based on the determined types (e.g., determined in step 715) and/or based on the determined arrangements (e.g., determined in step 720). Exemplary arrangements were previously described above and described in reference to at least FIGS. 9A-D. In some aspects, a method may comprise displaying, on a display of a head-mounted computing device (e.g., a VR headset) and in a first arrangement, a plurality of GUI elements. As previously described, each of the plurality of GUI elements may indicate a different character of a plurality of characters and/or may indicate a different color of a plurality of colors. By displaying GUI elements for password entry on a head-mounted computing device (which may include one or more shields), in random arrangements, and/or in random orders, the person entering the password via the head-mounted device may have privacy and security during password entry, and shoulder surfers might not be able to see or guess the password entered by the user of the head-mounted device. For example, just observing a person entering the password using the methods and systems described herein might not reveal any helpful information, and reproducing previous head movements might not do any good towards guessing the password.

In step 730, the head-mounted computing device may determine whether it has received a user selection of one of the plurality of GUI elements displayed on the display of the head-mounted computing device. If the head-mounted computing device has not received a user selection of a GUI element (step 730: N), the head-mounted computing device may return to step 725 and wait to receive a user selection. The head-mounted computing device may use a time out parameter to end the authentication process if the user has not provided an input within a timeframe indicated by the time out parameter.

During display of the plurality of GUI elements, the head-mounted computing device (e.g., a VR headset) may receive a user selection of a GUI element from the plurality of GUI elements displayed in a particular arrangement. The user selection may comprise an actuation of a button (e.g., a physical or touch-sensitive button) associated with the hear-mounted computing device, such as actuation of a button on the head-mounted computing device itself or a button on an associated remote control. One or more subsequent selections by the user may also comprise actuation of the button associated with the head-mounted computing device. Additionally or alternatively, the user selection may comprise a blink of an eye, which may be captured by a rear-facing camera of the head-mounted computing device. One or more subsequent selections by the user may also comprise eye blinks. Additionally or alternatively, the user selection may comprise a movement of the user's head to a particular direction, which may be captured by accelerometer(s), gyroscope(s), and/or magnetometer(s) of the head-mounted computing device. For example, a color panel may be pointed to via head movement and selected using a selection button. One or more subsequent selections by the user may also comprise movement of the user's head. If the head-mounted computing device has received a user selection of a GUI element (step 730: Y), the head-mounted computing device may proceed to step 735.

In step 735, the head-mounted computing device may display an indication of the user selection of the GUI element. The GUI element and/or corresponding character or color may be displayed to the user, such as for a short period of time (e.g., 1 second). Alternatively, the head-mounted computing device might not present feedback to the user, whether the panel selected by the user is right or wrong.

In step 740, the head-mounted computing device may store the user selection of the GUI element in memory, such as an internal memory device of the head-mounted computing device. The head-mounted computing device may also store the sequence of the user selections if the user has selected multiple characters and/or colors during credential entry.

In step 745, the head-mounted computing device may determine whether to display additional arrangements of GUI elements to the user. The head-mounted computing device may display a number of arrangements of GUI elements that is greater than or equal to the number of characters and/or colors in the user's credentials. In some aspects, the head-mounted computing device may display a predetermined number of arrangements, such as four arrangements, six arrangements, or ten arrangements. A subsequent arrangement (e.g., a second arrangement) may be different from a previous arrangement (e.g., a first arrangement). Additionally or alternatively, the subsequent arrangement may be different from all previous arrangements for a particular session, such as a password challenge session. For example, after receiving the previous user selection of a GUI element, the head-mounted computing device may display, on the display of the head-mounted computing device and in an arrangement different from the previous arrangement, the plurality of GUI elements or a different plurality of GUI elements. Because the location and/or arrangement of panels may vary from display to display, an onlooker recording the head movements would not be able to capture the password, leading to a more secure password.

As previously described, the arrangements may comprise panels indicating colors, characters, or a combination thereof. For example, the first arrangement displayed to the user may comprise a plurality of colors, and subsequent arrangements may each comprise a plurality of characters, such as numbers. Moreover, each display of GUI elements may be random, such as the exemplary arrangement illustrated in FIG. 9A, or structured, such as the exemplary arrangement illustrated in FIG. 9B. For example, the first arrangement of colors may comprise 10 different colors randomly arranged according to the arrangement illustrated in FIG. 9A. The head-mounted display device may request the user to select a color from the 10 different, randomly arranged colors. The location of the color panels may change each time or change periodically so that someone looking at the user's head movement (e.g., a shoulder surfer) cannot repeat the head movement to guess the correct color. Subsequent arrangements of numbers may comprise 10 different numbers arranged in a structured format, such as the grid format illustrated in FIG. 9B. The numbers in each arrangement may be displayed in numerical order or in a random order each time. If the head-mounted computing device determines to display additional GUI elements to the user (step 745: Y), the head-mounted computing device may return to step 715 to determine the type(s) of selectable GUI elements to display to the user.

If the head-mounted computing device determines not to display additional GUI elements to the user (step 745: N), the head-mounted computing device may proceed to step 750. For example, the head-mounted computing device may have displayed a set number of arrangements. If the computing device determines that the number of arrangements displayed to the user is greater than a predetermined number of arrangements, the head-mounted computing device may proceed to step 750. As previously explained, the predetermined number of arrangements to display may be greater than or equal to the number of characters and/or colors in the user's password (e.g., 6 characters).

In step 750, the head-mounted computing device may determine a sequence of the user's selections. As previously described, each character and/or color selected by the user may be stored in memory, and the head-mounted computing device may determine the sequence of the user's selections based on the data stored in memory.

In step 755, the head-mounted computing device may compare the sequence of the user's selections to a predetermined sequence of characters, colors, and the like. For example, the computing device may compare the sequence of user selections to the user's credentials (e.g., password).

In step 760, the head-mounted computing device may determine whether the sequence entered by the user via the head-mounted computing device matches the predetermined sequence (e.g., the user's password). For example, the computing device may determine, based at least in part on the user's selections (e.g., sequence of colors and/or characters), whether to grant the user access to a resource. If the inputted sequence matches the predetermined sequence (step 760: Y), the head-mounted computing device may proceed to step 765 to grant access to one or more requested resources. If the inputted sequence does not match the predetermined sequence (step 760: N), the head-mounted computing device may proceed to step 770 to deny access to one or more requested resources.

In step 765, the head-mounted computing device may grant the user access to a resource that is protected by the user's credentials. For example, once the colors and/or characters that have been selected match what was initially set as the password by the user, the computing device may grant, to the user, access to one or more resources being protected by a password. Various resources may be protected by the credentials. For example, the resource may comprise the head-mounted computing device (e.g., a VR headset) and/or an application running on the head-mounted computing device, and entering the correct password may unlock the VR headset or give access to the application. The resource may comprise a device wirelessly connected (e.g., paired) to the virtual reality headset, such as a laptop, smartwatch, smartphone, or other user device, and entering the correct password may unlock the connected user device. The resource may comprise an enterprise resource, which may comprise secure applications (e.g., wrapped applications) and/or resources hosted on one or more servers and accessible via a user device, such as the head-mounted computing device or a device paired to the head-mounted computing device. The password entered by the user may be used in a single sign on (SSO) environment. Once the user enters the correct password, the user may be granted access to a plurality of resources protected by an SSO password.

In step 770, the head-mounted computing device may deny the user access to a resource that is protected by user credentials if the user entered an incorrect password. Alternatively, the user may be given a predetermined number of additional opportunities to provide the correct credentials via the head-mounted computing device. The number of attempts and exponential time delays can be configured to make brute force attacks to guess the password even more difficult.

Figure 8:
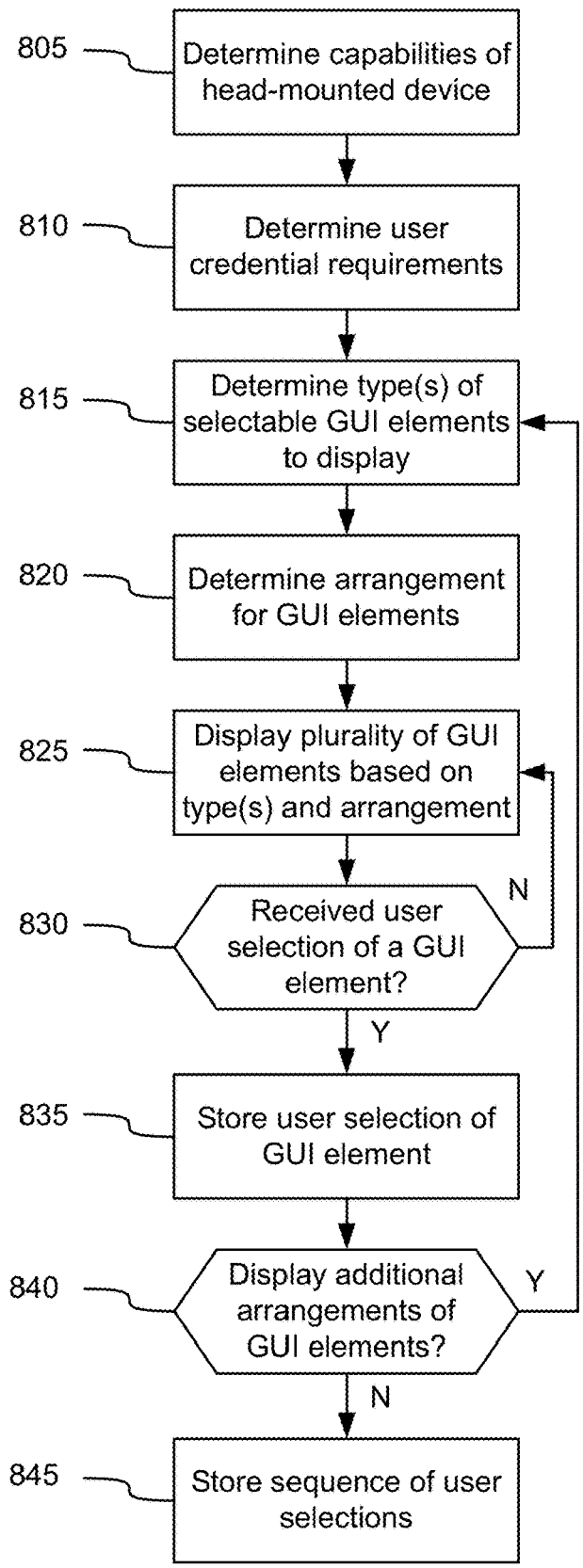
FIG. 8 illustrates an example method of securely setting up credentials via a head-mounted display device in accordance with one or more illustrative aspects described herein.

FIG. 8 illustrates an example method of securely setting up credentials via a head-mounted display device in accordance with one or more illustrative aspects described herein. In some aspects, a user may set up a password using the head-mounted computing device. By setting up a password using the head-mounted device, the same data security advantages described above with respect to entering credentials via a head-mounted display device may be present.

In step 805, the capabilities of the head-mounted computing device may be determined. Step 805 may be similar to step 710 previously described. The capabilities of the head-mounted computing device may be used to determine the type(s) and/or arrangement(s) of GUI elements to display to the viewer. In some aspects, the more sensors the head-mounted computing device has, the more options the computing device may have for arranging the GUI elements.

In step 810, requirements for the user credential may be determined. The requirements may comprise a password complexity, such as length requirements, the types of characters and/or colors required in the password, among other requirements. For example, the password may be required to have at least one color and at least a predetermined number of characters (e.g., 8 characters). As another example, the complexity chosen for the password may comprise one color followed by six numbers. The complexity and the number of characters may be set by an administrator that is in charge of managing, for example, user devices, such as the head-mounted computing device. If the user devices are managed, the complexity requirements may be part of parameters sent down from a server (used to manage the user devices) to the user device, such as during device enrollment. If the password is used to protect a cloud-based service, the cloud-based service may set the password complexity requirements. Once password complexity has been resolved, the user may be asked to setup a password that adheres to the required complexity. For example, the password requirements may be displayed to the user during password setup.

In step 815, the head-mounted computing device may determine the type(s) of selectable GUI elements to display to the user. Step 815 may be similar to step 715 previously described. For example, GUI elements may indicate different colors, different characters, or a combination thereof. The types of GUI elements to display to the user may also be based on the complexity requirements determined in step 810. For example, the complexity requirements may indicate that at least one color, at least one number, and at least one letter is to be used for the password. In this example, the head-mounted computing device may display at least one color for the user to select, at least one number for the user to select, and at least one letter for the user to select. The complexity requirements may indicate a preferred order, such as to have the color as the first element of the password. In this example, the head-mounted computing device may display a plurality of colors for the user to choose from as the first element of the password.

In step 820, the head-mounted computing device may determine an arrangement for GUI elements to be displayed to the user. Step 820 may be similar to step 720 previously described. For example, the arrangement may comprise a random arrangement of panels or a structured arrangement of panels. The panels may also be arranged in a specific order (e.g., numerically, alphabetically, by color spectrum, and the like) or may be arranged in a random order. As previously described, the arrangement selected may be based on the capabilities of the head-mounted computing device (e.g., sensor capabilities).

In step 825, the head-mounted computing device may display a plurality of GUI elements based on the determined type(s) and arrangements. Step 825 may be similar to step 725 previously described. Each of the plurality of GUI elements displayed to the user may indicate a different character of a plurality of characters and/or may indicate a different color of a plurality of colors. For example, a first screen displayed to the user may comprise a set of 10 distinct color panels from which the user chooses one.

In step 830, the head-mounted computing device may determine whether it received a user selection of a GUI element. Step 830 may be similar to step 730 previously described. If the head-mounted computing device has not received a user selection of a GUI element (step 830: N), the head-mounted computing device may return to step 825 and wait to receive a user selection. During display of the plurality of GUI elements, the head-mounted computing device (e.g., a VR headset) may receive a user selection of a GUI element from the plurality of GUI elements displayed in a particular arrangement, such as via actuation of a button, gesture, or other user action. If the head-mounted computing device has received a user selection of a GUI element (step 830: Y), the head-mounted computing device may proceed to step 835.

In step 835, the head-mounted computing device may store the user selection of the GUI element. Step 835 may be similar to step 740 previously described. For example, the head-mounted computing device may store the user selection of the GUI element in memory, such as an internal memory device of the head-mounted computing device.

In step 840, the head-mounted computing device may determine whether to display additional arrangements of GUI elements. Step 840 may be similar to step 745 previously described. In some aspects, the head-mounted computing device may display a predetermined number of arrangements of GUI elements, such as seven or ten arrangements. For example, after displaying the color panels, the head-mounted computing device may display ten digit panels (e.g., from 0 to 9) in a grid, and the user may select a desired panel during each display. This process may be repeated a certain number of times, such as five times if the password comprises six digits. The number of arrangements displayed to the user may correspond to the credential requirements (e.g., as determined in step 810). For example, the complexity requirements may indicate that at least one color, at least one number, and at least one letter is to be used for the password. In this example, the head-mounted computing device may display at least one color for the user to select, at least one number for the user to select, and at least one letter for the user to select to be part of the password. If the head-mounted computing device determines to display additional GUI elements to the user (step 840: Y), the head-mounted computing device may return to step 815 to determine the type(s) of selectable GUI elements to display to the user. If the head-mounted computing device determines not to display additional GUI elements to the user (step 840: N), such as if the user has finished setting up credentials, the head-mounted computing device may proceed to step 845.

In step 845, the head-mounted computing device may securely store the sequence of user selections. The sequence of user selections may comprise the user's credentials (e.g., password), which may be used to access one or more resources. For example, the user credential may comprise a PIN. Once the PIN is set and selected, the PIN may be used to access a resource, such as the head-mounted computing device or a remote resource.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
   displaying, on a display of a head-mounted device, a first arrangement of a plurality of graphical user interface (GUI) elements, wherein a type of the first arrangement is selected based on a first capability of the head-mounted device;

receiving, by the head-mounted device, a first user selection of a first GUI element from the first arrangement of the plurality of GUI elements, wherein the first GUI element is displayed at a first virtual depth on the display of the head-mounted device, and wherein the first GUI element indicates a first character;

after receiving the first user selection, displaying, on the display of the head-mounted device, a second arrangement of the plurality of GUI elements, wherein a shape of the second arrangement is different from a shape of the first arrangement, wherein a type of the second arrangement is selected based on a second capability of the head-mounted device, and wherein the first capability is different from the second capability;

receiving, by the head-mounted device, a second user selection of a second GUI element from the second arrangement of the plurality of GUI elements, wherein the second GUI element is displayed at a second virtual depth, different from the first virtual depth, on the display of the head-mounted device, and wherein the second GUI element indicates a second character;

determining, based on the first user selection from the first arrangement of the plurality of GUI elements and the second user selection from the second arrangement of the plurality of GUI elements, a first character sequence comprising the first character and the second character; and determining, based on a comparison between the first character sequence and a second character sequence, whether to grant user access to a resource, wherein the second character sequence was determined before the displaying the first arrangement of the plurality of GUI elements.

2. The method of claim 1, wherein the first user selection is based on a first actuation of a physical button associated with the head-mounted device, and the second user selection is based on a second actuation of the physical button associated with the head-mounted device.

3. The method of claim 1, wherein the first user selection is based on a first eye blink captured by a camera associated with the head-mounted device, and the second user selection is based on a second eye blink captured by the camera associated with the head-mounted device.

4. The method of claim 1, wherein the first user selection is based on a first head movement measured by one or more sensors associated with the head-mounted device, and the second user selection is based on a second head movement measured by the one or more sensors associated with the head-mounted device.

5. The method of claim 1, further comprising:
displaying, on the display of the head-mounted device, a second plurality of GUI elements, wherein each of the second plurality of GUI elements indicates a different color of a plurality of colors; and
receiving, by the head-mounted device, a third user selection of a third GUI element from the second plurality of GUI elements,
wherein the determining whether to grant the user access to the resource is further based on the third user selection.

6. The method of claim 1, wherein the head-mounted device comprises a virtual reality headset having the display or an augmented reality headset having the display.

7. The method of claim 1, wherein the resource comprises an enterprise resource.

8. The method of claim 1, wherein the resource comprises an application running on the head-mounted device.

9. The method of claim 1, wherein the resource comprises a device wirelessly connected to the head-mounted device.

10. The method of claim 1, wherein the second character sequence corresponds to a predetermined user credential.

11. A head-mounted computing device comprising:
a display;
a processor; and
memory storing computer-readable instructions that, when executed by the processor, cause the head-mounted computing device to:
display, on the display, a first arrangement of a plurality of graphical user interface (GUI) elements, wherein a type of the first arrangement is selected based on a first capability of the head-mounted computing device;
receive a first user selection of a first GUI element from the first arrangement of the plurality of GUI elements, wherein the first GUI element is displayed at a first virtual depth on the display of the head-mounted computing device, and wherein the first GUI element indicates a first character;
after receiving the first user selection, display, on the display, a second arrangement of the plurality of GUI elements, wherein a shape of the second arrangement is different from a shape of the first arrangement, wherein a type of the second arrangement is selected based on a second capability of the head-mounted computing device, and wherein the first capability is different from the second capability;
receive a second user selection of a second GUI element from the second arrangement of the plurality of GUI elements, wherein the second GUI element is displayed at a second virtual depth, different from the first virtual depth, on the display of the head-mounted computing device, and wherein the second GUI element indicates a second character;
determine, based on the first user selection from the first arrangement of the plurality of GUI elements and the second user selection from the second arrangement of the plurality of GUI elements, a first character sequence comprising the first character and the second character; and
determine, based on a comparison between the first character sequence and a second character sequence, whether to grant user access to a resource, wherein the second character sequence was determined before the displaying the first arrangement of the plurality of GUI elements.

12. The head-mounted computing device of claim 11, further comprising:
a button, wherein the first user selection is based on a first actuation of the button, and the second user selection is based on a second actuation of the button.

13. The head-mounted computing device of claim 11, further comprising:
a camera, wherein the first user selection is based on a first eye blink captured by the camera, and the second user selection is based on a second eye blink captured by the camera.

14. The head-mounted computing device of claim 11, further comprising:
one or more sensors, wherein the first user selection is based on a first head movement measured by the one or more sensors, and the second user selection is based on a second head movement measured by the one or more sensors.

15. The head-mounted computing device of claim 11, wherein the computer-readable instructions, when executed by the processor, further cause the head-mounted computing device to:
    display, on the display, a second plurality of GUI elements, wherein each of the second plurality of GUI elements indicates a different color of a plurality of colors; and
    receive a third user selection of a third GUI element from the second plurality of GUI elements, and
    wherein the computer-readable instructions, when executed by the processor, cause the head-mounted computing device to determine whether to grant the user access to the resource further based on the third user selection.

16. The head-mounted computing device of claim 11, wherein the head-mounted computing device comprises a virtual reality headset or an augmented reality headset.

17. The head-mounted computing device of claim 11, wherein the resource comprises an enterprise resource.

18. The head-mounted computing device of claim 11, wherein the resource comprises an application running on the head-mounted computing device.

19. The head-mounted computing device of claim 11, wherein the resource comprises a device wirelessly connected to the head-mounted computing device.

20. A non-transitory computer-readable medium storing instructions that, when executed by a head-mounted computing device, cause the head-mounted computing device to:
    display, on a display of the head-mounted computing device, a first arrangement of a plurality of graphical user interface (GUI) elements, wherein a type of the first arrangement is selected based on a first capability of the head-mounted computing device;
    receive a first user selection of a first GUI element from the first arrangement of the plurality of GUI elements, wherein the first GUI element is displayed at a first virtual depth on the display of the head-mounted computing device, and wherein the first GUI element indicates a first character;
    after receiving the first user selection, display, on the display of the head-mounted computing device, a second arrangement of the plurality of GUI elements, wherein a shape of the second arrangement is different from a shape of the first arrangement, wherein a type of the second arrangement is selected based on a second capability of the head-mounted computing device, and wherein the first capability is different from the second capability;
    receive a second user selection of a second GUI element from the second arrangement of the plurality of GUI elements, wherein the second GUI element is displayed at a second virtual depth, different from the first virtual depth, on the display of the head-mounted computing device, and wherein the second GUI element indicates a second character;
    determine, based on the first user selection from the first arrangement of the plurality of GUI elements and the second user selection from the second arrangement of the plurality of GUI elements, a first character sequence comprising the first character and the second character; and
    determine, based on a comparison between the first character sequence and a second character sequence, whether to grant user access to a resource, wherein the second character sequence was determined before the displaying the first arrangement of the plurality of GUI elements.

21. The non-transitory computer-readable medium of claim 20, wherein the first user selection is based on a first actuation of a physical button associated with the head-mounted computing device, and the second user selection is based on a second actuation of the physical button associated with the head-mounted computing device.

* * * * *